(12) United States Patent
Hein

(10) Patent No.: US 7,445,147 B2
(45) Date of Patent: Nov. 4, 2008

(54) STORED VALUE CARD VALIDATION (75) Inventor: Aaron Ray Hein, Bella Vista, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 19 days.

(21) Appl. No.: 11/277,426

(22) Filed: Mar. 24, 2006

(65) Prior Publication Data
US 2006/0255126 A1 Nov. 16, 2006

Related U.S. Application Data (60) Provisional application No. 60/665,106, filed on Mar. 25, 2005.

(51) Int. Cl.
G06K 5/00 (2006.01)
G06F 17/00 (2006.01)
G06F 7/08 (2006.01)
G06Q 20/00 (2006.01)
G06Q 40/00 (2006.01)

(52) U.S. Cl. .................. 235/380; 235/375; 235/381; 235/382; 705/17; 705/39; 705/40

(58) Field of Classification Search ................ 235/375, 235/379–382; 705/16, 17, 35, 39, 40
See application file for complete search history.

(56) References Cited

U.S. PATENT DOCUMENTS

| | | | |
|---|---|---|---|
| 4,123,747 A | 10/1978 | Lancto et al. | |
| 4,476,468 A | 10/1984 | Goldman | |
| 4,594,663 A | 6/1986 | Nagata et al. | |
| 4,707,592 A | 11/1987 | Ware | |
| 4,734,564 A | 3/1988 | Boston et al. | |
| 4,837,422 A | 6/1989 | Dethloff et al. | |
| 5,101,098 A | 3/1992 | Naito | |
| 5,577,109 A | 11/1996 | Stimson et al. | |
| 5,721,768 A | 2/1998 | Stimson et al. | |
| 5,814,796 A | 9/1998 | Benson et al. | |
| 6,000,608 A | 12/1999 | Dorf | |
| 6,089,611 A | 7/2000 | Blank | |
| 6,169,975 B1 | 1/2001 | White et al. | |
| 6,183,017 B1* | 2/2001 | Najor et al. | 283/101 |
| 6,189,787 B1 | 2/2001 | Dorf | |
| 6,202,933 B1* | 3/2001 | Poore et al. | 235/493 |
| 6,328,209 B1* | 12/2001 | O'Boyle | 235/380 |
| 6,375,073 B1 | 4/2002 | Aebi et al. | |
| 6,473,500 B1 | 10/2002 | Risafi et al. | |
| 6,545,361 B2 | 4/2003 | Ueda et al. | |

(Continued)

Primary Examiner—Karl D. Frech
Assistant Examiner—April A Taylor
(74) Attorney, Agent, or Firm—Wood, Herron & Evans, LLP (57) ABSTRACT An apparatus and method reads magnetic stripe data and bar code data from a stored value card. The magnetic stripe data and the bar code data originally applied to the card are associated with one another. For instance, the magnetic stripe data may be encrypted to determine a number that corresponds to a numerical sequence embedded in the bar code data. The magnetic stripe and the bar code data are compared at the point of sale. If the comparison produces a match, the card activation, store purchase or other transaction may proceed. Otherwise, the stored value card may be discarded. When the stored value card is originally purchased, the activation of the card may be delayed until payment for the card is actually received.

11 Claims, 4 Drawing Sheets

U.S. PATENT DOCUMENTS

| | | |
|---|---|---|
| 6,575,361 B1 | 6/2003 | Graves et al. |
| 6,879,966 B1 | 4/2005 | Lapsley et al. |
| 6,886,742 B2 | 5/2005 | Stoutenburg et al. |
| 6,892,187 B2 | 5/2005 | Phillips et al. |
| 7,083,081 B2 * | 8/2006 | McGee et al. ............... 235/375 |
| 7,168,615 B2 * | 1/2007 | Smith ......................... 235/380 |
| 2003/0001005 A1 * | 1/2003 | Risafi et al. ................. 235/380 |
| 2005/0015336 A1 * | 1/2005 | Yeates et al. .................. 705/40 |
| 2005/0199705 A1 * | 9/2005 | Beck et al. .................. 235/380 |
| 2006/0015402 A1 * | 1/2006 | Graves et al. ................. 705/14 |
| 2006/0120519 A1 * | 6/2006 | Tamari et al. ............ 379/114.2 |

* cited by examiner

STORED VALUE CARD VALIDATION

CROSS-REFERENCE TO RELATED APPLICATIONS

This application claims the benefit of the filing date of Provisional U.S. Patent Application No. 60/665,106, entitled "STORED VALUE CARD VALIDATION", filed on Mar. 25, 2005. The entire disclosure of that provisional U.S. patent application is incorporated into this application by reference.

FIELD OF THE INVENTION

The present invention generally relates to stored value card technologies, and more particularly, to verifying that a transaction involving a stored value card is authorized to proceed.

BACKGROUND OF THE INVENTION

The wide appeal of stored value cards has attracted the unwelcome attention of criminals seeking to exploit the conveniences and automated processes afforded by such cards. A stored value card, which may also be known as a gift card, a prepaid card, a shopping card and fare card, among other names, typically comprises a plastic card having identifying information that is associated with an account. In many cases, the identifying information is stored on a magnetic stripe. The account has a monetary balance against which purchases of store items may be made. This balance is generally maintained for security and accountability considerations within a computer system located at the point of sale or at a remote location.

Each stored value card is by design associated with a unique account, which becomes activated when a processing center enables the account. During a transaction, a customer will present a stored value card to a cashier, and account information from the card is read off of the card at the point of sale register. For instance, the cashier may swipe the card through a magnetic stripe reader. Software at the point of sale terminal dials a stored telephone number via a modem to call a processing center, which may check the appropriateness of the account number and/or requested funds. Should the processing center recognize the card data as belonging to a valid account, the processing center will authorize the transaction. For instance, the processing center may activate an account associated with the card, or may allow a purchase to be credited against a monetary balance associated with an already activated stored value card. From the perspective of the processing center, the account number read from the card may or may not be the rightful account number originally applied to the card.

While stored value cards have become very popular with both consumers and retailers, they have been accompanied by certain vulnerabilities that criminals routinely exploit, costing consumers and retailers significant amounts of money and anxiety. One such vulnerability includes the absence of an independent, point of sale system for determining whether the stored value card is actually associated with the correct account. More particularly, conventional electronic credit transactions presume for the sake of practical convenience and expense that the account information conveyed on a stored value card accurately identifies the unique account originally associated with the card. As such, criminals routinely misappropriate and manipulate stored value cards and associated account information to perpetrate unauthorized transactions.

In one scenario, a criminal will purchase a stored value card from a merchant, thereby causing an account associated with identifying information on the stored value card to become activated. The criminal will then remove from the store additional cards that have not yet been activated, and then alter the magnetically stored information on the inactivated value cards to match that of the activated card. As such, all of the altered, inactivated cards will have magnetic stripe information that identifies the account of the originally purchased card. The criminal will then return the altered cards to the store shelf where unsuspecting customers seeking to purchase a stored value card will unwittingly place money into the account of the criminal. Although the merchant and legitimate buyer believe they are adding tendered money to a new account uniquely associated with their card, the tendered money is actually added to the account of the criminal. The criminal may thus succeed in having legitimate buyers put funds into their account on their behalf, which they may access using their originally purchased card.

In another scenario, criminals rely on a delay that conventionally occurs when activating an account associated with a stored value card. Prior to card activation, a purchaser typically selects a stored value card off of a store rack or shelf and hands it to a cashier. The cashier will scan or otherwise activate the card, and will place the card in a shopping bag or in the hand of the purchaser. A short time thereafter, payment for the stored value card is tendered by the purchaser when the bill is paid for the card and any other items bought at the store.

Criminals have exploited this delay between when the card is activated and when payment is actually tendered by using funds activated in the account before the would-be purchaser tenders payment. For instance, a criminal may feign that they have forgotten their wallet in their car, or may come up with some other excuse to leave the store with the activated stored value card, having no intention of returning to pay for the card. The criminal may thus return to the store at a later time to use the balance of the stored value card for which they did not pay.

In another scenario, a stored value card is activated as described above, but this time the criminal presenting the card works with a partner at another store register. To perpetrate this fraud, both criminals use cards having the same account number. That is, the magnetic stripe information of one of the cards has been previously altered to match that of the other card. The first criminal presents the card for activation as described above. The partner will wait for this activation and will otherwise time their purchase using the card having the same account information so that they can access the balance of the newly created account. For instance, the first criminal presenting the card for activation may call on a cellular phone his or her partner who is waiting at another store with a card that has been altered to have the same account information that was just activated by the first criminal. The partner receiving the call will present the stored value card to pay for store goods, and because an account has been established for the duplicate account information on the card, neither the merchant nor the processing center is aware of the fraud until it is too late. The criminal who originally presented the card for purchase will again prematurely end the purchase transaction, and as a result, the criminals will have succeeded in purchasing items using the second stored value card before payment can ever be collected for the stored value card.

In the common scenarios described above, the transactions will likely be approved if the account data received by the processing center is determined to be valid, irrespective of whether the account data was originally intended for the actual card. The result will be a loss to the store credit issuer, the business involved, and/or the rightful owner of the card.

Efforts to battle fraud are themselves costly, and often fail. Most proposals involve modifications to the card readers or other infrastructure changes that are difficult and costly to deploy, especially given that the necessary infrastructure may be distributed over hundreds or thousands of locations. Some of these proposals are impractical, while others are inconvenient and annoying. As a consequence, there exists a need for an improved manner of verifying that a transaction involving a stored value card should proceed.

SUMMARY OF THE INVENTION

The present invention provides an improved apparatus and method for conducting a transaction using a stored value card that addresses the problems of the prior art by utilizing both a magnetic stripe and a bar code to guard against fraudulent transactions.

In one aspect of the invention, magnetic stripe and bar code data are both determined from the stored value card and are used to determine whether to proceed with a transaction. For example, a program executing at a point of sale terminal may compare the bar code and magnetic stripe data to determine if there is a match. If a match is found, the transaction may proceed, e.g., to activate an account associated with the stored value card, or to record a debit against an already activated account during a purchase. If, however, no match between the bar code and the magnetic stripe data can be established, the transaction may be prohibited.

Another aspect of the invention addresses the problems of the prior art by delaying activation of an account associated with the stored value card until a confirmation of payment for the stored value card is received. Associated processes may include receiving a request to activate the account, generating confirmation that actual payment has been tendered for the stored value card, and ultimately activating the account in response to the confirmation.

Another aspect of the invention includes manufacturing a stored value card by generating magnetic stripe data and bar code data for the stored value card, wherein the bar code data and the magnetic stripe data are associated by design. Both the magnetic stripe and bar code data are applied to the card during manufacturing. The magnetic stripe data and the bar code data may be associated directly with each other, and/or may be associated with something else, such as an account. The magnetic stripe data and/or bar code data may be encrypted and applied to the card to provide the stored value card with both bar code and magnetic stripe data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Aspects of the present invention include a stored value card that includes both bar code data and magnetic stripe data for guarding against fraudulent transactions. The magnetic stripe data and the bar code data originally applied to the card are associated with one another. For instance, the magnetic stripe data may be encrypted to determine a number that corresponds to a numerical sequence embedded in the bar code data, which also may be encrypted. As such, the magnetic stripe and the bar code data are compared at the point of sale. If the comparison produces a match, there is a high likelihood that the card has not been tampered with. As such, the card activation, store purchase or other transaction may proceed.

Figure 1:
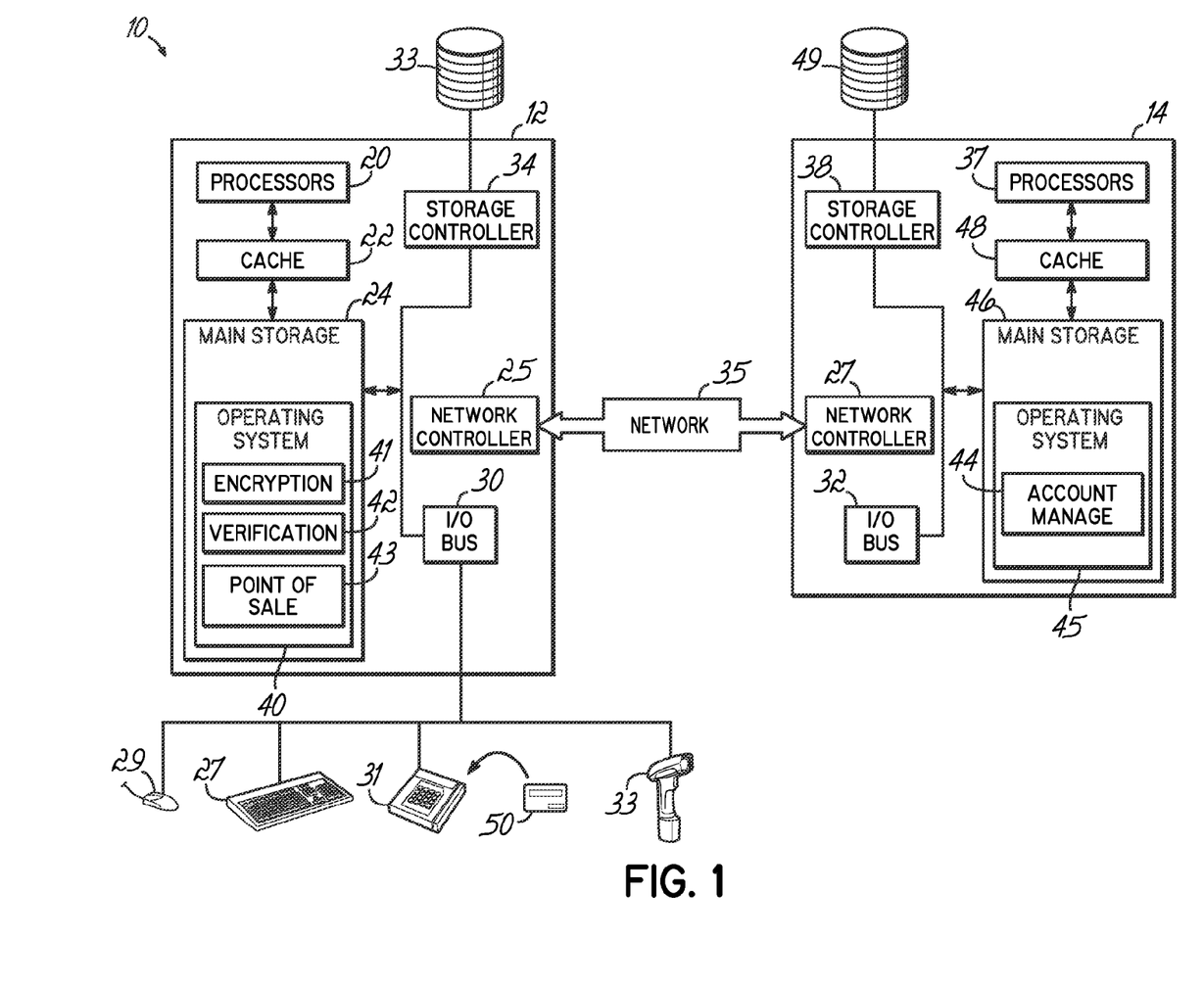
FIG. 1 is a block diagram of a system for determining whether an electronic transaction involving a stored value card is authorized to proceed.

Turning now to the Drawings, wherein like numbers denote like parts throughout several views, FIG. 1 illustrates a system for determining whether an electronic transaction involving a stored value card is authorized to proceed. More particularly, the system may verify that the data on magnetic stripe of the card has not been altered, i.e., was intended for use with the physical card. In one sense, this verification may be accomplished by applying onto the card bar code data that corresponds to the magnetic stripe data. As such, an embodiment consistent with the invention comprises an independent, point of sale system for determining whether the stored value card is actually associated with the account originally associated with the stored value card.

In general terms, the system reads magnetic stripe data and bar code data from the stored value card. The magnetic stripe data and the bar code data originally applied to the card were associated with one another. For instance, the magnetic stripe data may be encrypted to determine a sequence of numbers and/or characters that correspond to a sequence embedded and/or encrypted into the bar code data. The magnetic stripe and the bar code data may be compared at the point of sale. If the comparison produces a match, the card activation, store purchase or other transaction may proceed. Otherwise, the stored value card may be discarded. When the stored value card is originally purchased, the activation of the card may be delayed until payment for the card is actually received. A typical transaction may include the activation of an account associated with a stored value card. Another exemplary transaction may include an adjustment of a monetary value associated with the stored value card during a store purchase involving the card.

Now turning more particularly to FIG. 1, exemplary hardware configurations for a cash register 12 and a processing center computer 14 in networked computer system 10 are shown. Register 12 generically represents, for example, any of retail cash registers used to tabulate the amount of a sales transaction, to make a permanent and cumulative record of such transactions, and which typically has a drawer in which cash can be kept. Register 12 may also comprise or be in communication with one or more stand-alone or single-user computers, such as workstations, desktop computers, portable computers, handheld computers and the like, or any other programmable electronic devices (e.g., incorporating embedded controllers and the like). As such, the terms "system," "register" and "computer" are sometimes used interchangeably throughout this specification. In any case, it should be appreciated that the invention may be implemented in other computers and data processing systems, e.g., in multi-user computers such as a midrange computer, a mainframe computer, a network server, etc.

Register 12 generally includes one or more system processors 20 coupled to a main storage 24 through one or more levels of cache memory disposed within a cache system 22. Furthermore, main storage 24 is coupled to a number of types of external devices via a system input/output (I/O) bus 30. Such devices may include user input devices, such as a keyboard 27, a mouse 29, a magnetic card reader 31 and a bar code scanner 33. The magnetic stripe reader 31 works by reading magnetic signatures of magnetized particles embedded in the magnetic stripe of a card 50 as a cashier or customers swipes it through the reader 31. The bar code scanner 33 works by sweeping a spot of laser light across the bar code of the card 50. The scanner 33 reads the light reflected from the white areas of the bar code. Information read by the scanner 33 is converted into data that is sent to the point of sale register 12.

Other devices coupled to the I/O bus 30 may include a plurality of interface devices, e.g., a workstation controller 25 and a storage controller 34, which respectively provide external access to one or more external networks 35, e.g., the Internet, one or more computers 14, and/or one or more storage devices such as a direct access storage device 33. Any number of alternate computer architectures may be used in the alternative.

Register 12 includes within its main storage 24 an operating system 40 implementing encryption, verification and point of sale program code 41, 42 and 43 respectively. It will be appreciated, however, that the functionality or features described herein maybe implemented in other layers of software in register 12, and that the functionality may be allocated among other programs or computers within the system 10. Therefore, the invention is not limited to the specific software implementation described herein.

As shown in FIG. 1, the networked computer 14 may include many of the same or similar components as included in point of sale register 12. Namely, computer 14 may include: a network controller 27, a storage controller 38, processors 37, account management program 44, operating system 45, main storage 46 and cache memory 48. Computer 14 may be remotely located from register 12, and may be owned by a processing entity different from the retailer.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2A:
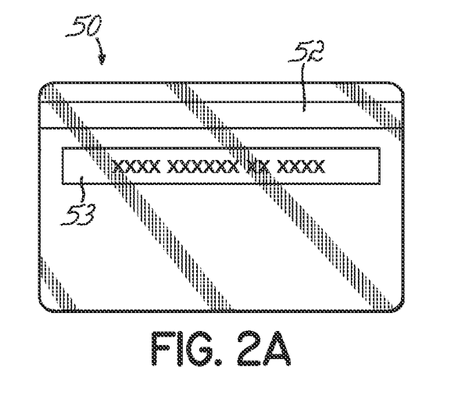
FIG. 2A shows a first side of a stored value card having magnetic stripe data for use in the system of FIG. 1.
Figure 2B:
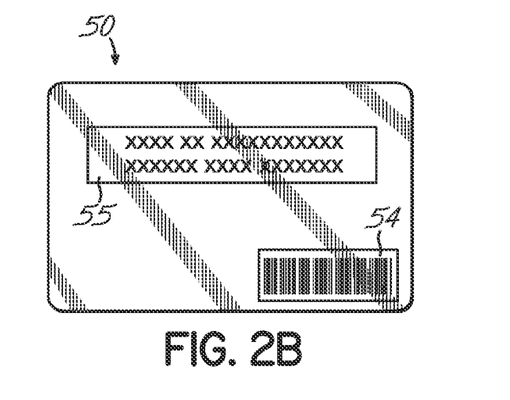
FIG. 2B shows a second side of the stored value card of FIG. 2A, including bar code data for use in the system of FIG. 1.

FIGS. 2A and 2B show front and back sides of a stored value card 50 such as may be used in the system 10 of FIG. 1. The card 50 includes both a magnetic stripe 52 and a bar code 54. The bar code data and the magnetic stripe data included within the stripe 52 and code 54 are associated with each other. For instance, the magnetic stripe data and the bar code data may both be associated with an account, which is also associated with the stored value card 50. The bar code data and/or the magnetic stripe data are typically encrypted. As such, an encryption program at the point of sale computer may be used to encrypt the magnetic stripe data such that the (encrypted) magnetic stripe data may be matched against the bar code data. As such, the magnetic strip data may comprise an encrypted portion of the magnetic stripe 52 that matches all or a portion of the data included within the bar code 54. Encryption is the process of using a mathematical algorithm to transform information into a format that is difficult by design to read. For instance, account information comprising the magnetic stripe data may be encrypted by re-arranging the account numbers. For purposes of this specification, the term, "encryption," may be used to include processes also known by "decryption," "encoding" and "coding."

Where desired, the stored value card 50 may include additional information 53, 55 that has been applied to the front and back sides of the card 50. Such information may include general store identification and card usage information, such as store address, a PIN number, and instructional language. While the magnetic stripe 52 and the bar code 54 are shown in FIGS. 2A and 2B as being on opposite sides of the same card 50, one skilled in the art will appreciate that the card of another embodiment may include both the magnetic stripe and the bar code on the same side of the card.

The magnetic stripe 52 may comprise a plastic film that includes tiny, iron-based magnetic particles. Each particle functions as a tiny bar magnet and may have a typical length of about two hundredth thousandths of an inch. Data becomes written onto the magnet stripe when the tiny bar magnets are magnetized in either a north or south pole direction. The magnetic stripe 52 may then be read when the hand of a cashier or purchaser slides the card 50 and associated magnetic particles through a magstripe card reader 31. The magnetic stripe data may be applied to one or more tracks typically included within the plastic film, each track being about eleven thousandths of an inch wide.

The bar code 52 typically comprises machine readable data, which may be alpha-numeric. Bar code data includes black and white lines arranged to represent a series of numbers to the bar code scanner 33. For instance, a bar code comprising a Universal Product Codes (UPC) will have twelve digits. Where desired, bar code data may comprise and/or be included in addition to such UPC or other identification codes. Such bar codes may be used, in part, by stores and manufacturers for inventory purposes and marketing information. When read by the register 12, they can reveal such specific information as the manufacturer's name, product name, size of product and price. This data is sent to the register 12 when the bar code 54 is scanned. Thus, the bar code scanner 33 functions to translate the bar code 54 into numbers and/or letters that are sent to the register 12. A point of sale program 43 in the computer processes the data read by the bar code scanner, and the data is at least in part used for comparison against the magnetic stripe data. A bar code for purposes of this specification may include any optically readable code, including, for example, multidimensional bar codes.

The discussion hereinafter focus on the specific routines utilized to conduct a transaction using a stored value card 50 in a manner consistent with the present invention. The routines executed to implement the embodiments of the invention, whether implemented as part of an operating system or a specific application, component, program, object, module or sequence of instructions, will also be referred to herein as "computer programs," "program code," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer-readable signal bearing media used to actually carry out the distribution. Examples of computer-readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various program code described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 3:
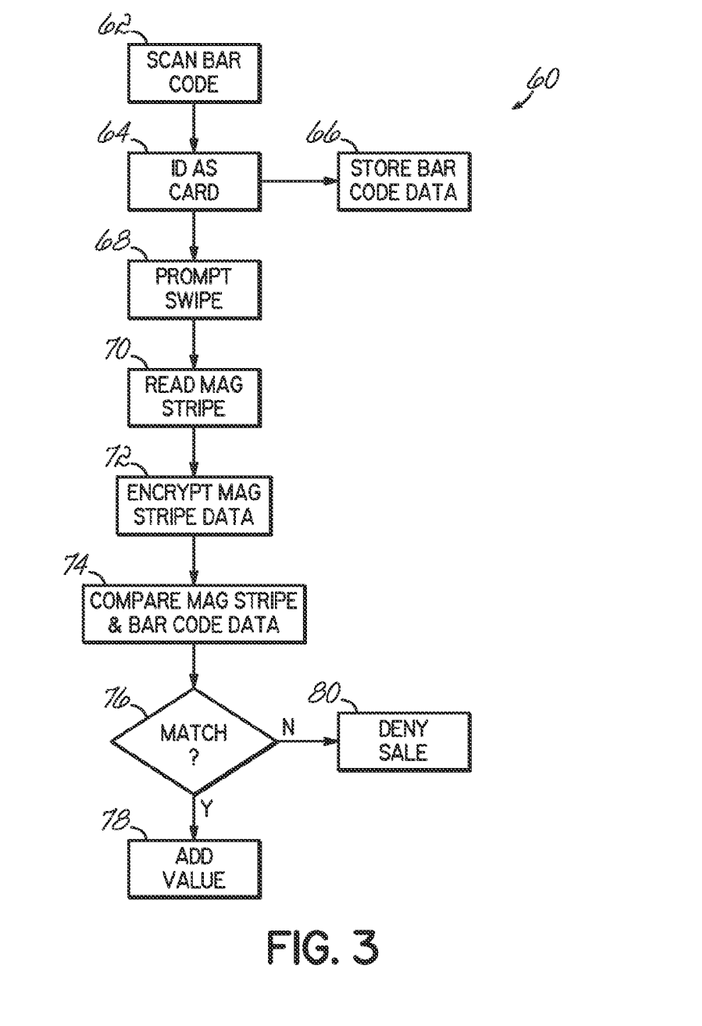
FIG. 3 is a flowchart having steps executable by a point of sale computer of FIG. 1 for initiating activation of an account associated with the stored value card of FIGS. 2A and 2B.

The flowchart 60 of FIG. 3 shows a sequence of exemplary steps for conducting a transaction using a stored value card such as may be implemented using the program code of FIG. 1. More particularly, the processes of the flowchart 60 are illustrated from the perspective of steps taken by point of sale register 12 of FIG. 1. Of note, the evaluation processes of the flowchart 60 may occur within the locally contained environment of the point of sale register 12.

In the context of the flowchart 60 of FIG. 3, the transaction comprises activating the stored value card 50. In a sense, the processes of FIG. 3 help to ensure that the data on the magnetic stripe 52 was meant to be associated with the stored value card 50. During activation, a customer will typically pick up an inactivated store value card 50 from a shelf or display. The customer will hand the inactivated stored value card 50 to a cashier. The cashier may then use a scanner 33 to scan the bar code 54 at block 62. As discussed herein, the bar code data includes digits that have been made to correspond with encrypted digits on the magnetic stripe 52.

From the bar code scanning at block 62, the point of sale register 12 may identify the stored value card 50 as actually being a stored value card. For instance, a UPC or other code of the bar code 54 may alert the system 10 that a customer is attempting to purchase a stored value card 50. In response to that determination at block 64, the register 12 may store at block 66 the bar code data scanned at block 62 for later use. For instance, the computer may identify and store a portion of the bar code data to be matched against the magnetic stripe data. To this end, the identification at block 64 of the item as being a stored value card 50 may also cause the register 12 to prompt the cashier or customer to swipe the magnetic stripe 52 through a reader 31.

The card reader 31 will read the magnetic stripe data at block 70. For instance, the reader 31 may read data off of one or more tracks of the magnetic stripe 52. Though not shown in the flowchart 60, one skilled in the art will appreciate that an additional verification may be accomplished when the magnetic stripe data is read. For instance, track one data of the magnetic stripe may include a name that may be compared to locally stored data. Similarly, the register 12 may check the validity of the bar code. For instance, the register 12 may check to see that the bar code includes the proper number of digits and/or an appropriate coding sequence of numbers and/or letters.

The register 12 at block 72 may then encrypt the magnetic stripe data. These encryption processes may include converting the magnetic stripe data into a sequence of numbers that may be compared to those numbers scanned from the bar code at block 62 and stored at block 66. One skilled in the art will appreciate that any number of public and private key encryption technologies may be used in accordance with the principles of the present invention.

The register 12 may then compare at block 74 the magnetic stripe data and the bar code data. Where so configured, a match may include only a portion of the information read from either the bar code 54 or the magnetic stripe 52. A match for purposes of this specification may include a numerical match between acceptable, predetermined parameters. If a match is determined at block 76, then the transaction may proceed at block 78. For instance, the card may be activated and/or monetary value may be added to an account associated with the card 50. As discussed herein, further transaction processes may include sending a request to a central processing computer 14, which may check to see if account and other information is correct.

Where no match can alternatively be found at block 76, then the sale of the card 50 may be denied at block 80. For instance, a prompt screen visible to the cashier may display a message directing the cashier to discard the stored value card 50.

Figure 4:
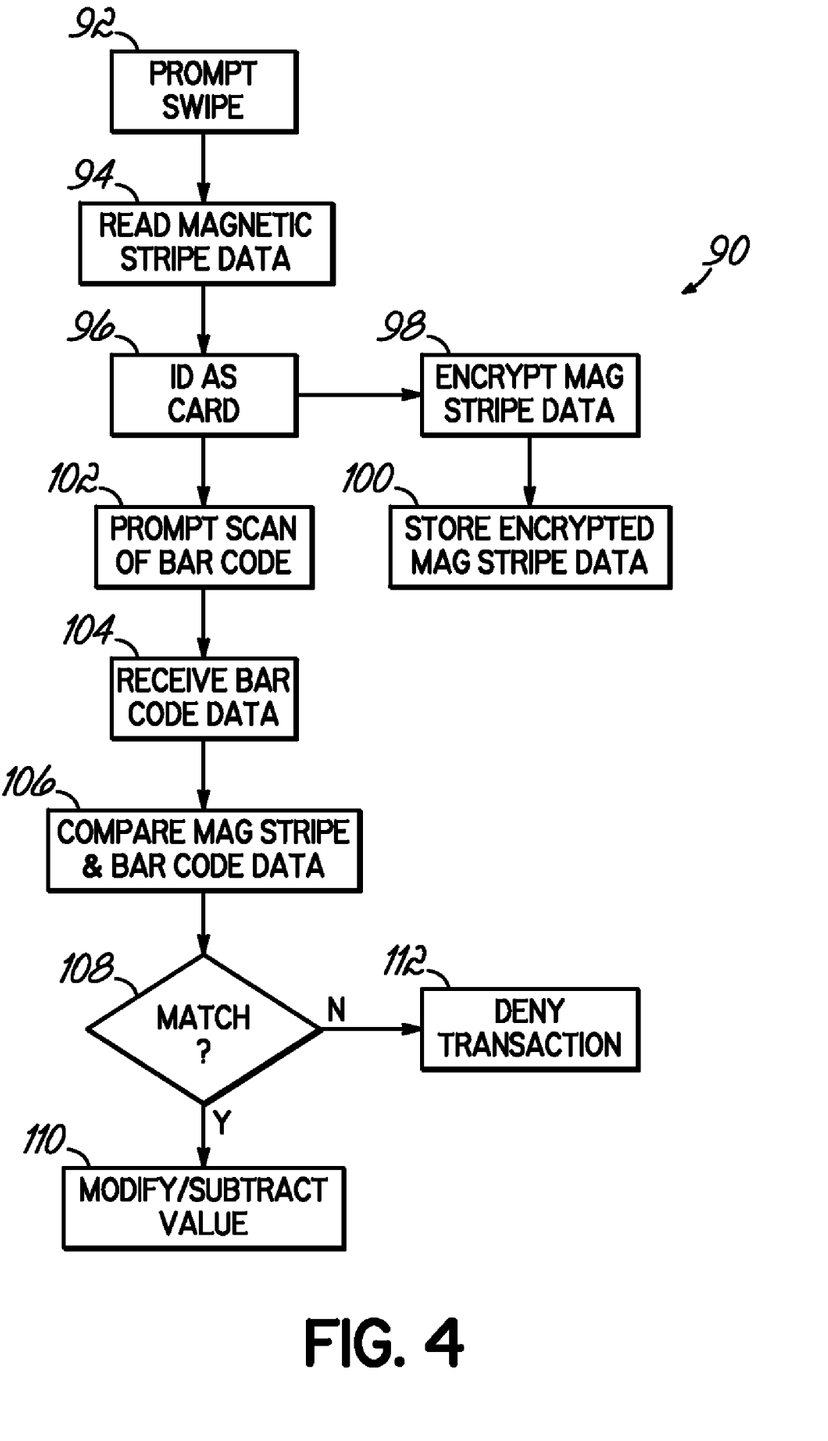
FIG. 4 is a flowchart having steps executable by a point of sale computer of FIG. 1 for using the stored value card of FIGS. 2A and 2B for making a store purchase.

FIG. 4 is a flowchart 90 having steps executable by the computer system 12 of FIG. 1 for conducting another transaction using a stored value card 50. More particularly, the processes of the flowchart 90 regard a point of sale transaction involving a purchase of a store item using the stored value card 50. At block 92 of FIG. 4, the purchaser provides their stored value card 50 to a cashier and/or a card reading device 31. The magnetic stripe 52 of the card 50 is subsequently swiped at block 92. The register 12 may read the magnetic stripe data at block 94 and identify at block 96 that the magnetic stripe is associated with a stored value card 50. As such, the register 12 may respectively encrypt and/or store the magnetic stripe data at blocks 98 and 100 of FIG. 4.

The register 12 may prompt at block 102 the scanning of the bar code 54 of the card 50 in response to identifying the stored value card at block 96. For instance, a scanner display at the point of sale terminal may instruct the cashier to scan the bar code 54. The register 12 may subsequently receive the bar code data at block 104.

The register 12 may then compare the magnetic stripe data to the bar code data at block 106. If a match is determined at block 108, then the computer may take steps at block 110 to subtract from or otherwise modify the monetary value associated with the card 50. Where no match can alternatively be found at block 108, then the computer may take steps to deny the transaction at block 112.

Figure 5:
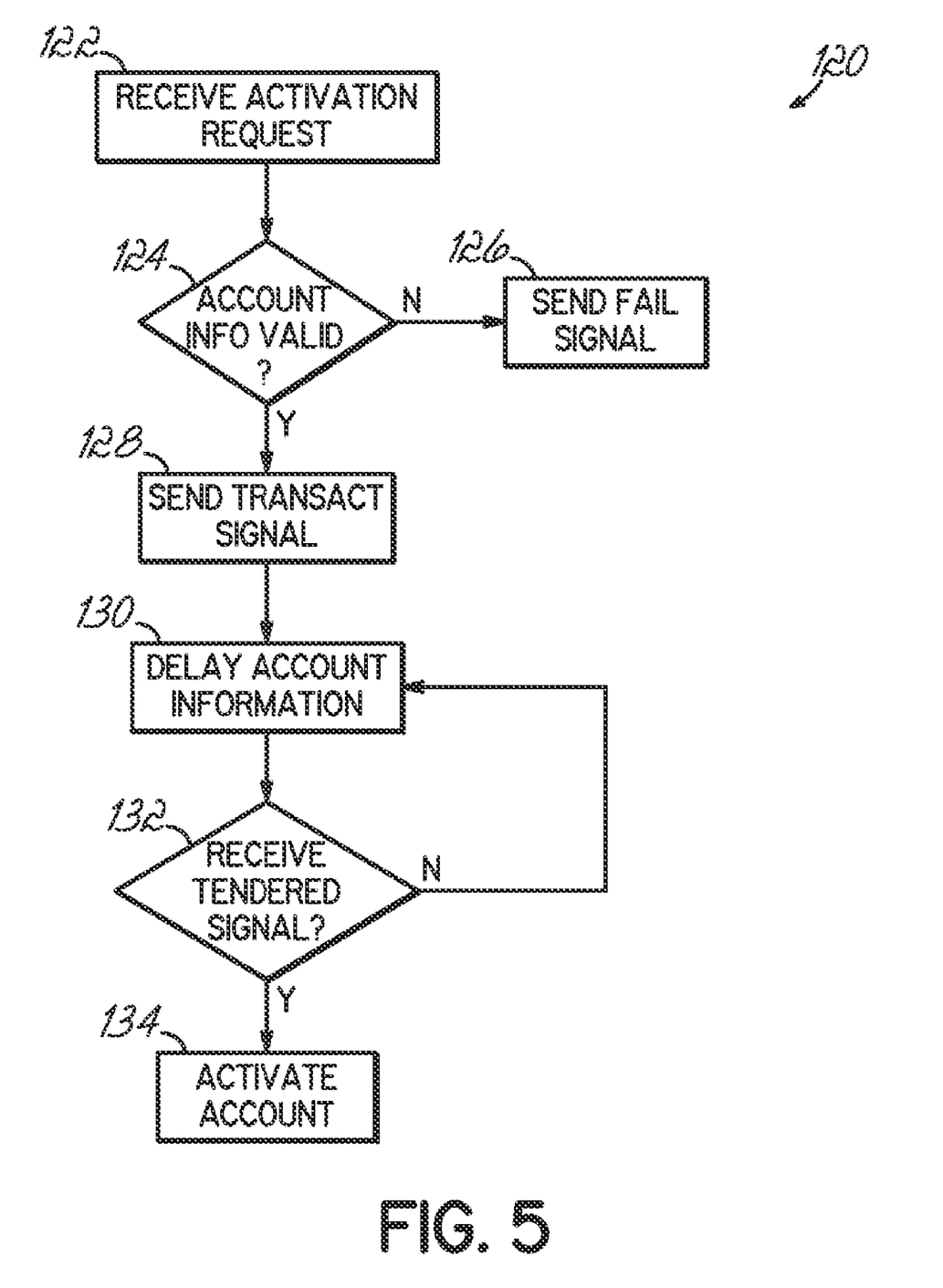
FIG. 5 is a flowchart having steps executable by the system of FIG. 1 for delaying activation of an account associated with a stored value card until a confirmation of payment for the stored value card is received.

The flowchart 120 of FIG. 5 includes a series of steps executable by the computer system 10 of FIG. 1 for delaying activation of an account associated with a stored value card until a confirmation of payment for the stored value card is received. The steps of the flowchart 120 are more particularly taken from the perspective of the central processing computer 14 of FIG. 1. The computer 14 may receive at block 122 of FIG. 5 a request to activate an account associated with the stored value card 50. The activation request is typically generated by the point of sale register 12. As such, the receipt of the activation request at block 122 may presume in one embodiment that the magnetic stripe and bar code data as discussed in FIG. 3 has matched to within predefined, acceptable parameters.

Where desired, the computer 14 may conduct an additional account information validation sequence at block 124. For instance, the computer 14 may determine that an account associated with the activation request of block 122 is available and/or otherwise appropriate. If not, then the computer 14 at block 126 may initiate and send a fail signal at block 126. The fail signal may ultimately end the transaction back at the point of sale register 12.

If at block 128 the account information is alternatively determined to be valid, then the computer 14 may send a signal back to the point of sale register 12 communicating that the computer is prepared to activate the account associated with the identified stored value card 50. The transact signal may prompt the cashier at the point of sale register 12 to collect tender by the customer seeking to purchase the stored value card 50.

The computer 14 will delay account activation at block 130 until it receives confirmation from the point of sale register 12 of the payment for the card 50. That is, if no confirmation signal of tendered payment is received at block 132, then the computer 14 will delay account activation indefinitely, or for some predetermined period of time before the transaction is canceled, altogether. Where the computer 14 alternatively receives the tendered signal at block 132, then the computer 14 may activate the account at block 134 for the amount indicated in the receive activation request or tendered signal. In this manner, the processes of the present invention interrupt conventional transactions by holding back activation of an account associated with stored value card until confirmation of payment for the card is received.

While the present invention has been illustrated by a description of various embodiments and while these embodiments have been described in considerable detail, it is not the intention of the applicant to restrict, or in any way limit, the scope of the appended claims to such detail. For instance, any of the steps of the above exemplary flowcharts may be deleted, augmented, made to be simultaneous with another or be otherwise altered in accordance with the principles of the present invention. Moreover, electronic transactions for purposes of this specification may include commercial transactions, as well as transactions involving access to controlled data, services or equipment. While stored value cards are generally synonymous to gift cards, prepaid cards and fare cards (for transportation), one skilled in the art will appreciate that the principles of the underlying invention may apply to other types of cards, including debit and credit cards. The present invention thus has application in private industry, personal and government arenas, to include credit exchange, personal, corporate and government security considerations. For instance, identification techniques in accordance with the present invention may be used to verify the authenticity of purchasers for credit, airline pilots and passengers, as well as that of corporate and military personnel accessing confidential information. Access to equipment may also be controlled with the present invention.

Additional advantages and modifications will readily appear to those skilled in the art. The invention in its broader aspects is therefore not limited to the specific details, representative apparatus and method, and illustrative example shown and described. For instance, while maintenance of the account associated with the stored value card may most advantageously be accomplished at a point of sale terminal or at a remote server, an embodiment of the present invention may also accommodate those cards that store their associated account balances within memory onboard the stored value cards, themselves. Accordingly, departures may be made from such details without departing from the spirit or scope of the applicant's general inventive concept.

What is claimed is:

1. A method of conducting a transaction using a stored value card associated with an adjustable monetary value, the method comprising:
   determining magnetic stripe data from the stored value card;
   using the magnetic stripe data to identify that the stored value card is a stored value card as opposed to a non-stored value card;
   in response to identifying that the stored value card is a stored value card, prompting a user at a point of sale register to input bar code data from the stored value card;
   determining bar code data from the stored value card;
   comparing at the point of sale register the determined bar code and magnetic stripe data to determine whether to proceed with the transaction;
   if the comparison results in a match, determining account data from at least one of the bar code and magnetic stripe data;
   sending the account data to a networked computer in communication with the point of sale register;
   receiving a transact signal at the point of sale register in response to the account data being determined correct;
   receiving a payment at the point of sale register; and
   generating and sending a confirmation of payment to the networked computer subsequent to receiving the transact signal and receiving the payment such that the monetary value associated with the stored value card is adjusted only after the payment and the transact signal are received.

2. The method of claim 1, wherein determining the magnetic stripe data further comprises encrypting the magnetic stripe data.

3. The method of claim 1, wherein determining the magnetic stripe data further comprises encrypting the bar code data.

4. The method of claim 1, further comprising prohibiting the transaction if there is no match.

5. The method of claim 1, further comprising activating the account in response to the confirmation.

6. The method of claim 1, further comprising determining at the networked computer if the account data is correct.

7. The method of claim 1, further comprising sending a fail signal if the account data is determined to be incorrect.

8. An apparatus comprising:
   a computer system comprising a point of sale register in communication with a networked computer, the computer system configured to conduct a transaction using a stored value card associated with an adjustable monetary value; and
   program code in communication with the computer system, the program code configured to determine magnetic stripe data from the stored value card, to use the magnetic stripe data to identify that the stored value card is a stored value card, to prompt a user at the point of sale register to input bar code data from the stored value card in response to identifying that the stored value card is a stored value card as opposed to a non-stored value card, to determine bar code data from the stored value card, to compare the determined bar code and magnetic stripe data to determine if a transaction involving the stored value card should proceed, the program code further configured to determine at the point of sale register account data from at least one of the bar code and magnetic stripe data if the comparison results in a match, to send the account data to the networked computer, to receive a transact signal at the point of sale register in response to the account data being determined correct, to receive a payment at the point of sale register; and to generate and send a confirmation of payment to the networked computer subsequent to receiving the transact signal and receiving the payment such that the monetary value associated with the stored value card is adjusted only after the payment and the transact signal are received.

9. The apparatus of claim 8, wherein at least one of the bar code and magnetic stripe data are encrypted.

10. A method of conducting a transaction using a stored value card associated with an adjustable monetary value, the method comprising:

determining magnetic stripe data of the stored value card at a point of sale register;

using the magnetic stripe data to identify that the stored value card is a stored value card at the point of sale register;

in response to identifying the stored value card is a stored value card, prompting a user of the point of sale register to input bard code data of the stored value card as opposed to a non-stored value card;

receiving account data generated at the point of sale register by comparing bar code and magnetic stripe data;

determining if the account data is correct;

sending a transact signal to the point of sale register in response to determining that the account data is correct;

receiving confirmation of a payment; and adjusting the monetary value associated with the stored value card only after sending the transact signal and receiving the payment confirmation.

11. The method of claim 10, further comprising sending a fail signal if the account data is determined to be incorrect.

* * * * *